United States Patent [19]
Thomas

[11] Patent Number: 5,737,161
[45] Date of Patent: Apr. 7, 1998

[54] OVERCURRENT PROTECTION DEVICE AND ARRANGEMENT

[75] Inventor: Brian Thomas, San Francisco, Calif.

[73] Assignee: Raychem Corporation, Menlo Park, Calif.

[21] Appl. No.: 758,110

[22] Filed: Nov. 25, 1996

[51] Int. Cl.$^6$ .................................................. H01H 47/28
[52] U.S. Cl. ............................... 361/7; 361/13; 361/58; 361/187; 361/210
[58] Field of Search .......................... 361/58, 10, 11, 361/13, 2, 5–9, 93, 99, 106, 165, 170, 187, 210; 338/22 R; 307/130–131; 335/155, 185; 336/182–183

[56] References Cited

U.S. PATENT DOCUMENTS

| | | | |
|---|---|---|---|
| 4,184,186 | 1/1980 | Barkan | 361/10 |
| 4,583,146 | 4/1986 | Howell | 361/13 |
| 4,695,917 | 9/1987 | Jackson et al. | 361/58 |
| 4,733,319 | 3/1988 | Yoshida et al. | 361/58 |
| 4,841,407 | 6/1989 | Baba et al. | 361/146 |
| 4,847,719 | 7/1989 | Cook et al. | 361/13 |
| 4,920,448 | 4/1990 | Bonhomme | 361/102 |
| 5,124,679 | 6/1992 | Kanazawa | 335/18 |
| 5,210,674 | 5/1993 | Yamaguchi et al. | 361/19 |
| 5,585,994 | 12/1996 | Tamai et al. | 361/98 |
| 5,590,013 | 12/1996 | Harasawa | 361/187 |

*Primary Examiner*—Jeffrey A. Gaffin
*Assistant Examiner*—Michael J. Sherry
*Attorney, Agent, or Firm*—Herbert G. Burkard

[57] ABSTRACT

Overcurrent protection arrangements including a relay comprising two coils wound on a common magnetic core and a PTC device coupled in parallel with the relay contacts. The arrangement comprises a circuit interruption element which has a normal state which permits the flow of a normal circuit current, $I_{NORMAL}$, to pass through the system, and a fault state which permits the flow of at most a reduced current, $I_{REDUCED}$, substantially less than $I_{NORMAL}$. A first control element is coupled in series between the power supply and the load, and is functionally linked to the circuit interruption element so that when the current through the first control element increases from $I_{NORMAL}$ to a relatively high current, $I_{FAULT}$, the first control element can convert the circuit interruption element into the fault state. A second control element is coupled in parallel with the circuit interruption element, and is functionally linked to the circuit interruption element so that if the circuit interruption element is converted to the fault state, the second control element can cause the circuit interruption element to remain in the fault state as long as the current through the second control element is at least $I_{REDUCED}$. The parallel combination of the circuit interruption element and second control element are coupled in series with the first control element. The relay contact functions as the circuit interruption element, and the two relay coils function as the first and second control elements.

19 Claims, 2 Drawing Sheets

OVERCURRENT PROTECTION DEVICE AND ARRANGEMENT

RELATED APPLICATIONS

This application is related to copending, commonly assigned U.S. patent application Ser. No. 08/564,457 now U.S. Pat. No. 5,666,254; copending, commonly assigned U.S. patent application Ser. No. 08/564,465; copending, commonly assigned U.S. patent application Ser. No. 08/564,495; and copending, commonly assigned U.S. patent application Ser. No. 08/564,831 now U.S. Pat. No. 5,689,395 which are all incorporated herein by reference for all purposes.

BACKGROUND OF THE INVENTION

1. Field of the Invention

This invention relates to electrical circuit overcurrent protection.

2. Introduction to the Invention

Copending, commonly assigned U.S. patent applications Ser. No. 08/564,457, now U.S. Pat. No. 5,666,254, application Ser. Nos. 08/564,465, 08/564,495 and 08/564,831 now U.S. Pat. No. 5,689,395 disclose circuit Protection arrangements comprising PTC devices and mechanical switches, including relays. By combining mechanical switches with PTC devices in the disclosed arrangements, the arrangements can be used to interrupt significantly higher currents than either the PTC devices or the mechanical switches could interrupt alone. The same arrangements can be used to downsize, i.e. use lower rated, mechanical switches and PTC devices for a given interrupt current level.

PTC circuit protection devices are well known. The device is placed in series with a load, and under normal operating conditions is in a low temperature, low resistance state. However, if the current through the PTC device increases excessively, and/or the ambient temperature around the PTC device increases excessively, and/or the normal operating current is maintained for more than the normal operating time, then the PTC device will be "tripped," i.e. converted to a high temperature, high resistance state such that the current is reduced substantially. Generally, the PTC device will remain in the tripped state, even if the current and/or temperature return to their normal levels, until the PTC device has been disconnected from the power source and allowed to cool. Particularly useful PTC devices contain a PTC element which is composed of a PTC conductive polymer, i.e. a composition which comprises (1) an organic polymer, and (2) dispersed, or otherwise distributed, in the polymer, a particulate conductive filler, preferably carbon black. PTC conductive polymers and devices containing them are described, for example in U.S. Pat. Nos. 4,237,441, 4,238,812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801 and 5,378,407, the disclosures of which are incorporated herein by reference for all purposes.

Under normal operating conditions of the circuit, a PTC circuit protection device is in a low temperature, low resistance state. However, if a fault occurs (e.g. if the current through the PTC device increases excessively, and/or the ambient temperature around the device increases excessively, and/or the normal operating current is maintained for more than the normal operating time), then the PTC device will be "tripped", i.e. converted into a high temperature, high resistance state such that the current in the circuit is reduced to a safe level. Generally, the PTC device will remain in the tripped state, even if the fault is removed, until the device has been disconnected from the power source and allowed to cool.

In a batch of PTC devices made by the same manufacturing process, uncontrollable variations in the process can cause substantial variation in the conditions which will trip any individual device. The largest steady state current which will not cause any of the devices in the batch to trip is referred to herein as the "pass current" ($I_{PASS}$) or "hold current", and the smallest steady state current which will cause all of the devices to trip is referred to as the "trip current" ($I_{TRIP}$). In general, the difference between $I_{PASS}$ and $I_{TRIP}$ decreases slowly as the ambient temperature increases. Depending on the particular type of device, $I_{TRIP}$ may for example be 1.5 to 2.5 times $I_{PASS}$ at 20° C. For any individual device, the pass current and the trip current are substantially the same. However, in this specification, reference is made to a PTC device having an $I_{PASS}$ and a different $I_{TRIP}$, because as a practical matter, the manufacturer of an electrical system must make use of PTC devices taken from a batch of such devices. Generally, the higher the ambient temperature, the lower the pass current and the trip current. This phenomenon is referred to as "thermal derating", and the term "derating curve" is used to denote a graph of temperature against pass current.

SUMMARY OF THE INVENTION

I have been investigating the behavior of circuit protection arrangements which comprise mechanical switches and PTC devices. The mechanical switches include relays, bimetal devices and the like. I have now discovered very useful electrical protection systems which comprise a relay comprising two coils wound on a common magnetic core. I have also discovered very useful protection systems which comprise such a two-coil relay and a PTC device coupled in parallel with the relay contacts.

In a first aspect, the invention provides an electrical protection system which can be coupled between an electrical power supply and an electrical load to form an operating circuit, and which, when so coupled, protects the circuit from overcurrents, which system comprises:

a. a circuit interruption element which
   (1) has a normal state which permits the flow of a normal circuit current, $I_{NORMAL}$, to pass through the system, and
   (2) has a fault state which permits the flow of at most a reduced current, $I_{REDUCED}$, substantially less than $I_{NORMAL}$;

b. a first control element which
   (1) in use, is coupled in series between the power supply and the load, and
   (2) is functionally linked to the circuit interruption element so that when the current through the first control element increases from $I_{NORMAL}$ to a relatively high current, $I_{FAULT}$, the first control element can convert the circuit interruption element into the fault state; and c. a second control element which
   (1) is coupled in parallel with the circuit interruption element, and
   (2) is functionally linked to the circuit interruption element so that if the circuit interruption element is converted to the fault state, the second control element can cause the circuit interruption element to remain in the fault state as long as the current through the second control element is at least $I_{REDUCED}$;

with the parallel combination of the circuit interruption element and second control element coupled in series with the first control element.

In a second aspect the invention provides an electrical protection system which can be coupled between an electrical power supply and an electrical load to form an operating circuit, and which when so coupled protects the circuit from overcurrents, which system comprises:

a. a circuit interruption element which (1) in use, is coupled in series with the power supply, (2) has a normal state which permits the flow of a normal circuit current, $I_{NORMAL}$, to pass through the system, and (3) has a fault state which permits the flow of at most a reduced current, $I_{REDUCED}$, substantially less than $I_{NORMAL}$;

b. a first control element which, in use, is coupled in series with the circuit interruption element; and c. second control element which in use, is coupled in parallel with the load;

wherein i. the second control element is functionally linked to the circuit interruption element so that, while the voltage across the second control element is a normal voltage, $V_{NORMAL}$, the second control element can cause the circuit interruption element to be in its normal state; and ii. the first control element is functionally linked to the circuit interruption element so that when the current through the first control element increases from $I_{NORMAL}$ to a relatively high current, $I_{FAULT}$, the first control element can convert the circuit interruption element into the fault state When a relay is deenergized, the armature of the relay is some distance from the coil. Sufficient current must be applied to the coil to generate enough magnetic force to pull the armature toward the coil. As the armature gets closer to the coil, the force acting on the armature increases, the greatest force pulling on the armature is achieved when the armature is against the coil. Once the armature is against the coil face, the current needed in the coil to maintain the armature in that position is significantly less than that needed to initially begin to pull the armature in. In certain embodiments of the devices and circuit protection arrangements of the invention, a first coil, designated the current coil, provides the magnetic force to pull the relay armature in, and a second coil, designated the voltage coil, provides the magnetic force to keep the armature pulled in. In other embodiments, the voltage coil provides the magnetic force to pull the relay armature in, and the current coil provides a magnetic force to overcome the magnetic force of the voltage coil and release the relay armature.

Thus, in a first two-coil arrangement, a current coil can be designed to generate a large magnetic force to pull the armature in, and a small, low power voltage coil can be designed to use a small trickle current to maintain the armature in the pulled in state. In a second two-coil arrangement, both the current and the voltage coils can be designed to be capable of independently energizing the relay to pull in the armature. By properly arranging the two coils in a circuit, the voltage coil may be used to pull in and hold the armature under normal current conditions, and the current coil may be used to develop a magnetic field which, under overcurrent conditions, negates the field developed by the voltage coil causing the armature to release. The combinations can be designed to use standard relay coils, or can be optimized to reduce the power and size requirements of the coils. The magnetic field generated by current in each coil is proportional to the product of the number of turns times the current flowing in the respective coil.

In two-coil arrangements of the invention, the voltage coil comprises T times the number of turns which the current coil comprises, where T is at least 10, preferably at least 100, particularly at least 1000.

The two-coil arrangements of the invention can be particularly useful to protect circuits from overcurrents which are a few times, e.g. 2 times, the normal circuit current. They are useful in both AC and DC applications. Two-coil arrangements according to a first aspect of the invention are particularly useful in applications requiring two-terminal circuit protection systems.

BRIEF DESCRIPTION OF THE DRAWINGS

The invention is illustrated in the accompanying drawings, in which like components are given the same reference numerals in each figure in which they appear, and in which.

DETAILED DESCRIPTION OF THE INVENTION

Figure 1:
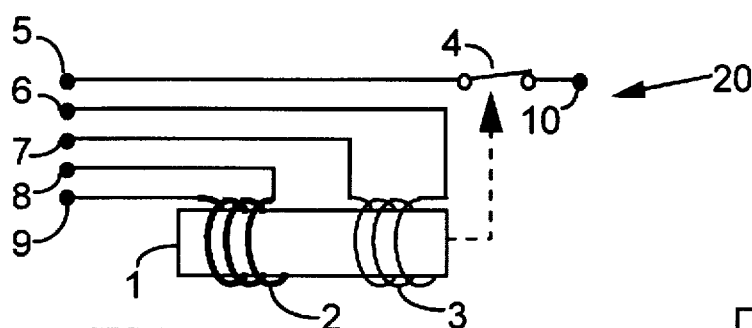
FIG. 1 shows a circuit diagram of a two-coil relay.

FIG. 1 shows a schematic diagram of an embodiment of a two-coil relay 20. The relay 20 is comprised of a magnetic core 1 on which are wound a first, low impedance coil 2, referred to herein as the current coil, and a second, high impedance coil 3, referred to herein as the voltage coil. The relay 20 comprises a normally closed set of relay contacts 4. Both the current coil 2 and voltage coil 3 can be capable of activating the relay 20 to open the relay contacts 4. The current coil 2 has a few turns on the core 1 and requires a large current to open the relay contacts 4. The voltage coil 3 has many turns on the core 1 and requires a small current to open the relay contacts. In a particular application, the precise number of turns required for the respective current coil 2 and voltage coil 3 will depend on the current and voltage levels required for the application. The voltage coil 3 may be sized so that it only capable of holding the armature (armature not illustrated in the FIGS.) in after the armature has been pulled in by the current coil 2, or the voltage coil 3 may be sized to be capable of pulling in the armature. This will depend on considerations such as the desired amount of leakage current in the circuit 30 when the voltage coil is energized and the relay contacts 4 open, and the impedance of the voltage coil 3 compared with that of a PTC device 11 shown in FIG. 5.

The two-coil relay 20 includes a contact input terminal 5, contact output terminal 10, current coil input terminal 9, current coil output terminal 8, voltage coil input terminal 7 and voltage coil output terminal 6.

In the examples of circuit protection arrangements disclosed herein, the relay 20 comprises a single set (single pole, single throw) of normally closed relay contacts 4. Depending on the application, a two-coil relay may have multiple contacts or sets of contacts (e.g., single pole, double throw; double pole, double throw; etc.).

Figure 2:
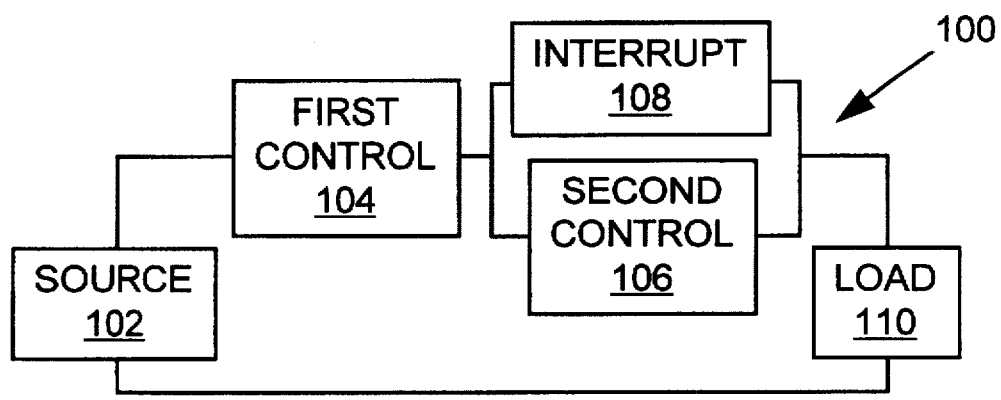
FIGS. 2 and 3 show block diagrams depicting overcurrent protection functions performed by electrical components in overcurrent protection circuits of this invention.
Figure 3:
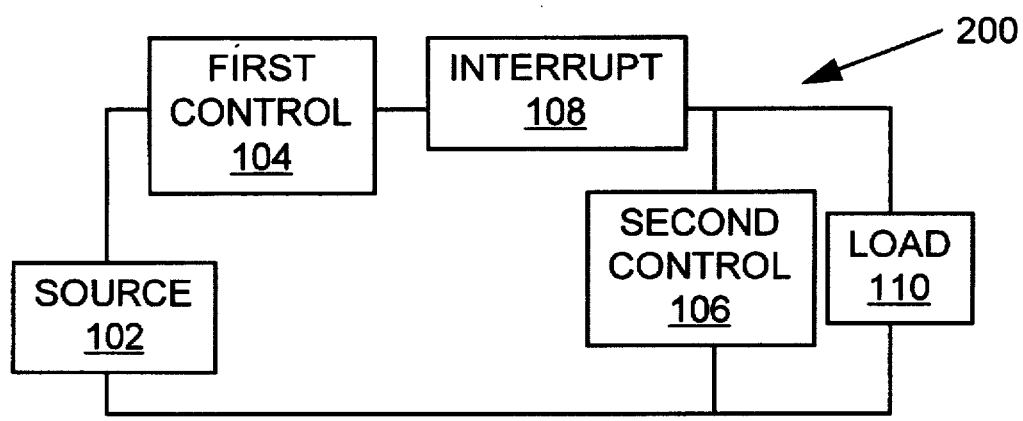

FIGS. 2 and 3 show block diagrams depicting operational elements of an overcurrent protection circuit that perform the functions of sensing the current, interrupting the circuit, and, in some arrangements, isolating the circuit from the power source.

The block diagram of FIG. 2 represents a first aspect of an overcurrent protection circuit, referred to by the general reference character 100. In the first aspect of overcurrent protection circuits of this invention, the functions of sensing the current and interrupting the circuit are performed by components which may be considered as being grouped in three operational elements, a first control element 104, a second control element 106 and an interrupt element 108. In addition, the source 102 and load 110 elements are two operational elements normally found in all electrical circuits.

The source 102 provides the electrical power to the circuit, and the load 110 performs the intended purpose of the circuit. The first control 104, second control 106 and interrupt 108 elements work cooperatively to provide the overcurrent protection. The first control element 104 senses the current and determines whether the current delivered to the load 110 is within a normal acceptable range. When the first control element 104 determines that the current delivered to the load 110 is excessive, the first control element 104 communicates with the interrupt element 108 causing the interrupt element 108 to interrupt the circuit 100 reducing the flow of current delivered to the load 110 and diverting current to the second control element 106. The second control element 106 then senses the reduced current in the circuit 100, and communicates with the interrupt element 108, causing the interrupt element 108 to keep the current at the reduced level until the cause of the excessive current is removed.

Figure 4:
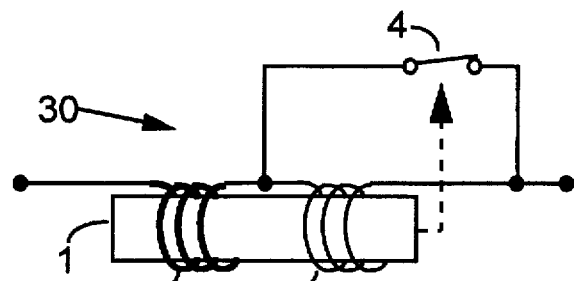
FIG. 4 is a circuit diagram of an embodiment of a first aspect of an overcurrent protection circuit employing an arrangement of a two-coil relay.

An embodiment of a first aspect of an overcurrent protection circuit 30 employing the two-coil relay 20 of FIG. 1 is shown in FIG. 4. The current coil 2 performs the function of the first control element 104, the voltage coil 3 performs the function of the second control element 106, and the relay contacts 4 perform the function of the interrupt element 108. The source 102 and load 110 are not illustrated in FIGS. 4 through 7. The arrangement shown in FIG. 4 can make use of a two-coil relay 20 of FIG. 1 by coupling the contact input terminal 5 to the current coil output terminal 8 and voltage coil input terminal 7; and by coupling the contact output terminal 10 to the voltage coil output terminal 6. The current coil input terminal 9 is used as the input terminal for the arrangement, and the output terminal for the arrangement is from the coupled voltage coil output terminal 6 and contact output terminal 10. The current coil 2 is sized so that, under normal current conditions, the relay contacts 4 are closed, but, at a predetermined current level, the current coil 2 will cause the relay contacts 4 to open.

In normal circuit operation, the normally closed relay contacts 4 short across the voltage coil 3, keeping the voltage across the voltage coil 3 at essentially zero volts. When an overcurrent occurs, the relay contacts 4 open, placing the voltage coil 3 in the circuit. The increased impedance of the voltage coil 3 causes the current through the current coil 2, and now the voltage coil 3, to decrease. The voltage coil 3 is sized so that, under overcurrent conditions, with both the current coil 2 and voltage coil 3 in the circuit, the current through the voltage coil 3 will keep the relay energized and the relay contacts 4 open.

When a mechanical switch, e.g. relay contacts, is operated to interrupt current flowing through it, arcing nearly always occurs between the contacts as they separate, even under normal operating conditions, and current (in the form of an arc) continues to flow through the switch until the arc is extinguished. The arc will damage the contacts to an extent which depends upon the current, the voltage, whether the current is AC or DC, the speed at which the contacts operate, and the material of which the contacts are made. A mechanical switch is usually rated according to the maximum current that it can safely interrupt at a stated AC or DC voltage and for a stated number of operations. Arcing across contacts opening under high current conditions can cause such contacts to burn and result in catastrophic failure of the mechanical device.

In the arrangement shown in FIG. 4, the relay contacts 4 must be capable of interrupting the fault current. Circuit arrangements disclosed in U.S. patent applications Ser. No. 08/564,457, now U.S. Pat. No. 5,666,254, application Ser. Nos. 08/564,465, 08/564,495 and 08/564,831 now U.S. Pat. No. 5,689,395 show arrangements comprising PTC devices and mechanical switches, including relays. The arrangements are capable of interrupting current levels which neither the PTC devices nor the mechanical switches are capable of interrupting alone. The arrangements also permit the use of lower rated PTC devices and mechanical switches to interrupt given current levels.

Figure 5:
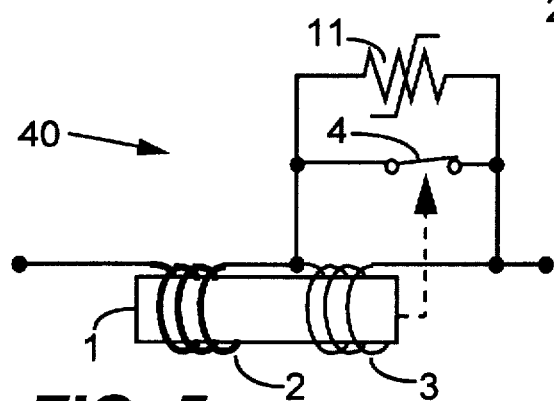
FIG. 5 is a circuit diagram of the circuit of FIG. 4 additionally employing a PTC device.

FIG. 5 shows an example of a circuit protection arrangement 40 combining a two-coil relay with a PTC device. The circuit 40 of FIG. 5 is the same as the circuit 30 shown in FIG. 4, with the addition of a PTC device 11 coupled across the relay contacts 4. In its low impedance state, the impedance of the PTC device 11 is significantly less than the impedance of the voltage coil 3. In the circuit 40, current normally flows through the current coil 2 and through the normally closed relay contacts 4. On an overcurrent condition, the current through the current coil 2 causes the relay contacts 4 to open. The relay contacts 4 open shunting the current through the PTC device 11. As the PTC device 11 trips to its high impedance state, and thereby reduces the current, the voltage across the PTC device 11 and the voltage coil 3 increases, causing sufficient current to flow through the voltage coil 3 to keep the relay contacts 4 open.

This circuit was tested using a Potter and Brumfield T90N5d12-12 relay with a second coil of magnet wire wound around the standard relay coil for a total of 8 turns. The standard relay coil was coupled to function as the voltage coil 3, and the second coil was coupled to function as the current coil 2. The relay was rated to interrupt a current of 20 amps at 28 volts DC. In one test, the combination of the relay and PTC device successfully interrupted a current of 575 amps at over 60 volts DC.

The arrangements of FIGS. 4 and 5 show the current coil 2 coupled in series with the parallel combination of the voltage coil 3, relay contacts 4 and, in FIG. 5, PTC device 11. The current coil 2 may, of course, be placed before or after the parallel combination.

The block diagram of FIG. 3 represents a second aspect of an overcurrent protection circuit, referred to by the general reference character 200. The arrangement of the source 102, first control 104, second control 106, interrupt 108 and load 110 elements is similar to the arrangement in FIG. 2, except that the second control element 106 is coupled in parallel with the load 110 rather than in parallel with the interrupt element 108. In this configuration, the second control element 106 senses the voltage across the load 110 and communicates with the interrupt element 108. Under normal circuit conditions, the second control element 106 causes the interrupt element 108 to remain closed, thereby allowing the circuit 200 to perform its normal function. However, under an overcurrent condition, the first control element 104 senses the overcurrent, communicates with the interrupt element 108, and causes the interrupt element 108 to interrupt the current in the circuit 200.

Figure 6:
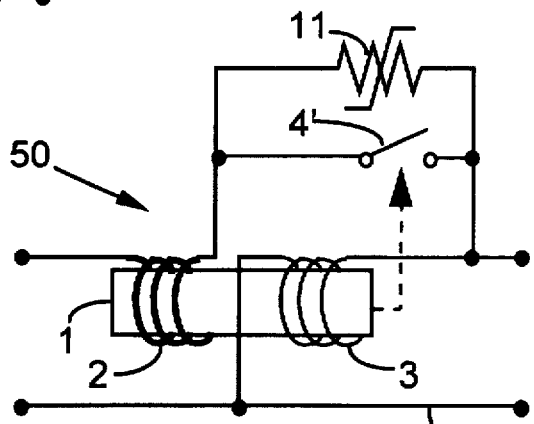
FIG. 6 is a circuit diagram of an embodiment of a second aspect of an overcurrent protection circuit employing an arrangement of a two-coil relay and a PTC device.

U.S. patent application Ser. No. 08/564,457 discloses overcurrent protection arrangements which will give a rapid response to overcurrents which cause a reduction in the voltage across the load, e.g. a partial or complete short across the load. The circuit shown in FIG. 6 is an example of an arrangement in accordance with the second aspect of the invention which includes a two-coil relay in a voltage-sensing overcurrent protection arrangement. The arrangement shown in FIG. 6 can make use of a two-coil relay 20 of FIG. 1 by connecting the contact input terminal 5 to the current coil output terminal 8, and the contact output terminal 10 to the voltage coil output terminal 6. The voltage coil input terminal 7 is coupled to the return line 12 of the circuit 50. The current coil input terminal 9 is used as the input terminal for the arrangement, and the output terminal for the arrangement is from the coupled voltage coil output terminal 6 and contact output terminal 10.

In the circuit 50, with a voltage source and load coupled (source and load not illustrated), initially, current momentarily flows through the PTC device 11 to the load. The voltage generated across the load appears across the voltage coil 3, and activates the relay, closing the normally open relay contacts 4'. Normal circuit current flows through the current coil 2 and the relay contacts 4 to the load. The coils are coupled in the circuit 50 so that the magnetic field developed by the current in the current coil 2 is opposite the magnetic field developed by the current in the voltage coil 3. The normal circuit current flowing through the current coil 2 is below the level required to counteract the magnetic field developed by the voltage coil 3, and the relay contacts 4' remain closed. When an overcurrent condition occurs, the current in the current coil 2 increases, and, at a predetermined level, is sufficient to counteract the magnetic field developed by the voltage coil 3, and causes the relay contacts 4 to open. When the relay contacts 4' open, the current is shunted to the PTC device 11. The PTC device 11 trips to its high impedance state and interrupts the current. The system voltage is impressed across the PTC device 11. The PTC device 11 remains in the high impedance state until the fault is removed and power is recycled.

If the presence of an overcurrent is accompanied by a decrease in the voltage across the load, e.g. due to a short across the load, then the magnetic field developed by the voltage coil 3 will decrease as the magnetic field developed by the current coil 2 increases. Thus, this arrangement will protect against a fault which is evidenced by an increase in current in the circuit (sensed by the current coil 2), a dropout of the voltage across the load (sensed by the voltage coil 3), or both.

Figure 7:
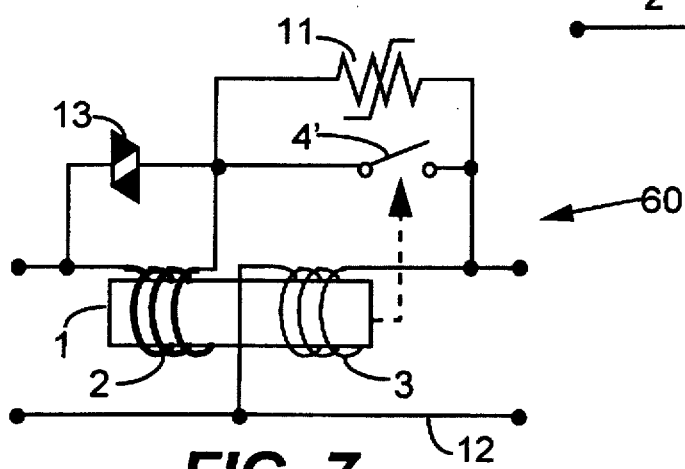
FIG. 7 is a circuit diagram of the circuit of FIG. 6 additionally employing a varistor as a voltage clamping device.

For very high fault currents, the magnetic field generated by the current coil 2 could be large enough to not only cancel the magnetic field developed by the voltage coil 3, but it could also be strong enough to keep the relay contacts 4' closed. FIG. 7 shows an arrangement which avoids this situation. A voltage clamping device 13 such as a Zener diode or a varistor (varistor shown in FIG. 6) can be coupled across the current coil 2 to prevent large currents from overdriving the current coil 2. The clamping voltage of the voltage clamping device 13 would be set to limit the voltage developed across the current coil 2 to that voltage which would cause the current in the current coil 2 to develop a magnetic field which would cancel the magnetic field developed by the voltage coil 3.

The arrangement of FIG. 6 shows the current coil 2, and the arrangement of FIG. 7 shows the parallel combination of the current coil 2 and varistor 13 coupled in series with the parallel combination of the relay contacts 4' and PTC device 11. The current coil 2, or parallel combination of the current coil 2 and varistor 13 may, of course, be placed before or after the parallel combination of the relay switch 4' and PTC device 11, with the voltage coil 3 coupled in parallel with the load.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, at that the disclosure herein includes all the appropriate combinations of information found in the different passages. Similarly, although the various figures and descriptions herein relate to specific embodiments of the invention, it is to be understood that where a specific feature is disclosed in the context of a particular figure, such feature can also be used, to the extent appropriate, in the context of another figure, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. An electrical protection system which can be coupled between an electrical power supply and an electrical load to form an operating circuit, and which when so coupled protects the circuit from overcurrents, which system comprises:

a. a circuit interruption element which
  (1) has a normal state which permits the flow of a normal circuit current, $I_{NORMAL}$, to pass through the system, and
  (2) has a fault state which permits the flow of at most a reduced current, $I_{REDUCED}$, substantially less than $I_{NORMAL}$;

b. a first control element which
  (1) in use, is coupled in series between the power supply and the load, and
  (2) is functionally linked to the circuit interruption element so that when the current through the first control element increases from $I_{NORMAL}$ to a relatively high current, $I_{FAULT}$, the first control element can convert the circuit interruption element into the fault state; and c. a second control element which
  (1) is coupled in parallel with the circuit interruption element, and
  (2) is functionally linked to the circuit interruption element so that if the circuit interruption element is converted to the fault state, the second control element can cause the circuit interruption element to remain in the fault state as long as the current through the second control element is at least $I_{REDUCED}$;

with the parallel combination of the circuit interruption element and second control element coupled in series with the first control element.

2. A system according to claim 1 wherein the circuit interruption element comprises a circuit switch having a normal state in which it is closed and a fault state in which it is open.

3. A system according to claim 2 wherein the first control element comprises a first relay coil which causes the circuit switch to move from its normal state to its fault state in response to increased current flowing in the first control element.

4. A system according to claim 2 wherein the second control element comprises a second relay coil which, when the circuit switch is in its fault state, will cause the circuit switch to remain in the fault state in response to increased current flowing in the second control element.

5. A system according to claim 2 wherein:
a. the first control element comprises a first relay coil which causes the circuit switch to move from its normal state to its fault state in response to increased current flowing in the first control element;
b. the second control element comprises a second relay coil which, when the circuit interruption element is in its fault state, will cause the circuit interruption element to remain in the fault state in response to increased current flowing in the second control element; and
c. the second relay coil comprises T times the number of turns which the first relay coil comprises, where T is at least 10.

6. A system according to claim 2 in which the circuit interruption element comprises a PTC device coupled in parallel with the circuit switch.

7. An electrical circuit, comprising an electrical power supply, a load, and a protection system coupled between the power supply and the load, the protection system protecting the circuit from overcurrents and comprising:
a. a circuit interruption element which
  (1) has a normal state which permits the flow of a normal circuit current, $I_{NORMAL}$, to pass through the system, and
  (2) has a fault state which permits the flow of at most a reduced current, $I_{REDUCED}$, substantially less than $I_{NORMAL}$;
b. a first control element which
  (1) is coupled in series between the power supply and the load, and
  (2) is functionally linked to the circuit interruption element so that when the current through the first control element increases from $I_{NORMAL}$ to a relatively high current, $I_{FAULT}$, the first control element can convert the circuit interruption element into the fault state; and
c. a second control element which
  (1) is coupled in parallel with the circuit interruption element, and
  (2) is functionally linked to the circuit interruption element so that if the circuit interruption element is converted to the fault state, the second control element can cause the circuit interruption element to remain in the fault state as long as the current through the second control element is at least $I_{REDUCED}$;

with the parallel combination of the circuit interruption element and second control element coupled in series with the first control element.

8. An electrical protection system which can be coupled between an electrical power supply and an electrical load to form an operating circuit, and which when so coupled protects the circuit from overcurrents, which system comprises:
a. a circuit interruption element which
  (1) in use, is coupled in series with the power supply,
  (2) has a normal state which permits the flow of a normal circuit current, $I_{NORMAL}$, to pass through the system, and
  (3) has a fault state which permits the flow of at most a reduced current, $I_{REDUCED}$, substantially less than $I_{NORMAL}$;
b. a first control element which, in use, is coupled in series with the circuit interruption element; and
c. a second control element which in use, is coupled in parallel with the load;
wherein
  i. the second control element is functionally linked to the circuit interruption element so that, while the voltage across the second control element is a normal voltage, $V_{NORMAL}$, the second control element can cause the circuit interruption element to be in its normal state; and
  ii. the first control element is functionally linked to the circuit interruption element so that when the current through the first control element increases from $I_{NORMAL}$ to a relatively high current, $I_{FAULT}$, the first control element can convert the circuit interruption element into the fault state.

9. A system according to claim 8 wherein the circuit interruption element comprises a circuit switch having a normal state in which it is closed and a fault state in which it is open.

10. A system according to claim 9 wherein the first control element comprises a first relay coil which causes the circuit switch to move from its normal state to its fault state in response to increased current flowing in the first control element.

11. A system according to claim 9 wherein the second control element comprises a second relay coil which causes the circuit switch to be in its normal state when the voltage across the second control element is $V_{NORMAL}$.

12. A system according to claim 9 wherein:
a. the first control element comprises a first relay coil which causes the circuit switch to move from its normal state to its fault state in response to increased current flowing in the first control element;
b. the second control element comprises a second relay coil which causes the circuit switch to be in its normal state when the voltage across the second relay coil is $V_{NORMAL}$; and
c. the second relay coil comprises T times the number of turns which the first relay coil comprises, where T is at least 10.

13. A system according to claim 9 in which the circuit interruption element comprises a PTC device coupled in parallel with the circuit switch.

14. A system according to claim 12 in which the first control element comprises a voltage clamping device in parallel with the first relay coil.

15. An electrical circuit, comprising an electrical power supply, a load, and a protection system coupled between the power supply and the load, the protection system protecting the circuit from overcurrents and comprising:

a. a circuit interruption element which
   (1) is coupled in series with the power supply,
   (2) has a normal state which permits the flow of a normal circuit current, $I_{NORMAL}$, to pass through the system, and
   (3) has a fault state which permits the flow of at most a reduced current, $I_{REDUCED}$, substantially less than $I_{NORMAL}$;
b. a first control element, coupled in series with the circuit interruption element; and
c. a second control element, coupled in parallel with the load;

wherein
   i. the second control element is functionally linked to the circuit interruption element so that, while the voltage across the second control element is a normal voltage, $V_{NORMAL}$, the second control element can cause the circuit interruption element to be in its normal state; and
   ii. the first control element is functionally linked to the circuit interruption element so that when the current through the first control element increases from $I_{NORMAL}$ to a relatively high current, $I_{FAULT}$, the first control element can convert the circuit interruption element into the fault state.

16. A relay comprising:
a. a set of contacts having
   (1) an deenergized position in which the contacts are one of open or closed, and
   (2) an energized position in which the contacts are the other of open or closed;
b. a magnetic core;
c. a first relay coil wound around the magnetic core; and
c. a second relay coil wound around the magnetic core;
wherein one relay coil comprises T times the number of turns which the other coil comprises, where T is at least 10.

17. The relay of claim 16 wherein both relay coils are individually capable of developing sufficient magnetic field to cause the relay contacts to move from the deenergized position to the energized position.

18. The relay of claim 16 where T is at least 100.

19. The relay of claim 18 wherein T is at least 1000.

* * * * *